US008568098B2

(12) United States Patent
Numajiri

(10) Patent No.: US 8,568,098 B2
(45) Date of Patent: Oct. 29, 2013

(54) PITCH DRIVE APPARATUS OF WIND GENERATOR AND WIND GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/600,494

(22) PCT Filed: Apr. 17, 2009

(86) PCT No.: PCT/JP2009/057753
§ 371 (c)(1),
(2), (4) Date: Nov. 17, 2009

(87) PCT Pub. No.: WO2010/119565
PCT Pub. Date: Oct. 21, 2010

(65) Prior Publication Data
US 2012/0025525 A1    Feb. 2, 2012

(51) Int. Cl.
*B63H 3/00*    (2006.01)
(52) U.S. Cl.
USPC ................... 416/162; 415/168 R; 415/108
(58) Field of Classification Search
USPC ......... 416/104, 108, 112, 147, 155, 158, 162, 416/164, 168 R; 415/155, 160, 162
See application file for complete search history.

(56) References Cited

U.S. PATENT DOCUMENTS

| 2,284,521 | A | * | 5/1942 | Insua | 416/50 |
| 6,604,907 | B1 | | 8/2003 | Lehnhoff | |
| 2007/0081896 | A1 | * | 4/2007 | Mollhagen | 416/98 |

FOREIGN PATENT DOCUMENTS

| JP | 63124874 A | 5/1988 |
| JP | 4365976 A | 12/1992 |
| JP | 11-141453 A | 5/1999 |
| JP | 2003056448 A | 2/2003 |
| JP | 2003148321 A | 5/2003 |
| JP | 2004-512450 A | 4/2004 |
| JP | 2005-188456 A | 7/2005 |
| WO | 2008/146557 A1 | 12/2008 |

OTHER PUBLICATIONS

Machine Translation of JP 2908906 B.*
Japanese Office Action for JP 2009-548924, dated Feb. 24, 2012.

(Continued)

*Primary Examiner* — Edward Look
*Assistant Examiner* — Maxime Adjagbe
(74) *Attorney, Agent, or Firm* — Kanesaka Berner & Partners, LLP

(57) ABSTRACT

The present invention provides a pitch drive apparatus of a wind generator and the wind generator constituted not to affect a main shaft or a gear box, and capable of preventing reliability from being deteriorated. The pitch drive apparatus includes a wind turbine blade (6) having a base portion (21) mounted so as to be turnable around an axis center L with respect to a rotor head (4), an electric drive member having an output shaft (19) mounted on the rotor head (4) so as to extend in a direction along the axis center (L), a lever (15) having one end fixed to the output shaft (19) and extending in a direction intersecting with the output shaft (19), and a connecting link (17) disposed so as to extend in a direction intersecting with the output shaft (19). One end of the connecting link (17) is rotatably mounted on a free end of the lever (15) and the other end of the connecting link (17) is rotatably mounted on a drive position P of the wind turbine blade (6).

4 Claims, 3 Drawing Sheets

(56) References Cited

OTHER PUBLICATIONS

International Search Report of Application No. PCT/JP2009/057753 mailed Jul. 14, 2009.

Decision to Grant for corresponding Japanese Patent Application No. 2009-548924, which issued on Nov. 13, 2012.

Decision to Grant a Patent issued May 30, 2013 corresponds to Korean patent application No. 10-2010-7020826.

* cited by examiner

PITCH DRIVE APPARATUS OF WIND GENERATOR AND WIND GENERATOR

CROSS-REFERENCE TO RELATED APPLICATION

The present application is based on International Application No.: PCT/JP2009/057753, filed Apr. 17, 2009, and priority is hereby claimed under 35 USC § 119 based on this application. This application is hereby incorporated by reference in its entirety into the present application.

TECHNICAL FIELD

The present invention relates to a pitch drive apparatus of a wind generator, and the wind generator.

BACKGROUND ART

As a wind turbine used for a wind generator, there are known wind turbines in which a pitch angle of a wind turbine blade is fixed and a wind turbine in which the pitch angle is variable.

As a mechanism for changing the pitch angle of the wind turbine blade, there is known a mechanism which converts linear motion of a rod in a hydraulic cylinder into rotation around an axis of the wind turbine blade as described in Patent Citation 1. Further, there is also proposed a mechanism which straightly moves a rod in an axial direction thereof using an electric operating machine, and a wind turbine blade is rotated around an axial direction thereof by the movement as described in Patent Citation 2 or the like.

There is also proposed a mechanism in which a gear is provided around a blade rotating wheel, a pinion gear meshing with the gear is rotated by an electric motor, the blade rotating wheel is rotated and this rotation is converted into rotation around an axis of the wind turbine blade as describe in Patent Citation 3. There is also proposed a mechanism which uses a belt instead of the gear.

Patent Citation 1: Japanese Unexamined Patent Application, Publication No. 2003-148321
Patent Citation 2: Japanese Unexamined Patent Application, Publication No. Sho 63-124874
Patent Citation 3: Japanese Unexamined Patent Application, Publication No. 2003-56448

DISCLOSURE OF INVENTION

According to the mechanism which uses the hydraulic cylinder as shown in Patent Citation 1, control oil of the hydraulic cylinder is usually supplied to a rotor head from a hydraulic pump disposed in a nacelle through a main shaft or a gear box. According to the mechanism described in Patent Citation 2, a rod for transmitting motion of the electric operating machine disposed in the nacelle is provided so as to pass through a main shaft or a gear box. Therefore, it is necessary to dispose a hydraulic pipe or the rod in the main shaft or the gear box, causing structures thereof to become complicated.

When the wind generator is assembled at the site, the nacelle and the rotor head assembled separately from each other are coupled together. At this time, in the case of a hydraulic pipe, the hydraulic pipe on the side of the nacelle and a hydraulic pipe on the side of the rotor head are connected to each other. If a foreign matter is mixed in the hydraulic pipe during the connecting operation, a seal of the hydraulic utility grid is damaged and thus there is a possibility that long-term reliability of the pitch drive mechanism is deteriorated.

There is an adverse possibility that oil leaks, which exerts an influence on the surrounding environment. Thus, it is necessary to pay close attention during the operation of connecting the hydraulic pipe.

According to the gear type pitch drive mechanism described in the Patent Citation 3, a pinion gear and a gear provided on a rotating wheel always mesh with each other. Since a lubricant oil cannot be circulated due to a structural reason, grease is applied for lubrication.

Normally, an adjusting amount of a pitch angle during one rotation of a rotor head is very small, e.g., from −0.5 to +0.5 (usually, from −0.1 to +0.1 or −0.2 to +0.2) at the most. Therefore, the number of meshed teeth between the gear and the pinion gear is limited one each. Since contact causing fine motion is concentrated locally, there is an adverse possibility that a fretting damage caused by depletion of oil slick on a gear surface is generated.

When a gear mounted around a rotating wheel is damaged, in order to replace the gear, it is necessary to remove the wind turbine blade and the rotor head. For this reason, an attempt is made to design such that the strength of the gear is increased more than the pinion gear so as to damage the pinion gear instead of the gear, but it is impossible to estimate when and where a fretting damage occurs at the time of design.

Thus, there is a possibility that long-term reliability of the pitch drive apparatus is deteriorated.

In the case of a belt type pitch drive mechanism, in order to apply tension, a belt is disposed outside the wind turbine blade. Therefore, a system is increased in size. Since lifetime of the belt is short, it is necessary to replace the belt frequently. Thus, if sufficient maintenance operation is not carried out, there is a possibility that long-term reliability of the pitch drive mechanism is deteriorated.

In view of the above circumstances, it is an object of the present invention to provide a pitch drive apparatus of a wind generator and the wind generator capable of preventing a main shaft and a gear box from being affected and capable of preventing reliability from being deteriorated.

To achieve the above object, the present invention provides the following means.

According to a first aspect of the present invention, there is provided a pitch drive apparatus of a wind generator, the pitch drive apparatus including: a wind turbine blade having a blade root mounted so as to be turnable around a blade longitudinal direction with respect to a rotor head; an electric drive member disposed such that an output shaft extends in the blade longitudinal, direction; a lever fixed to the output shaft and extending in a direction intersecting with the output shaft; and a coupling rod disposed so as to extend in a direction intersecting with the output shaft and rotatably mounted around the blade longitudinal direction so as to connect drive positions of the lever and the wind turbine blade with each other.

According to the above aspect, when the electric drive member is operated and an output shaft is rotated, the lever rotates within a plane intersecting with the output shaft around a portion mounted on the output shaft, i.e., a plane intersecting with the blade longitudinal direction. That is, the lever rotates so as to draw a circle around the rotation shaft.

When the lever moves, the coupling rod mounted on the lever moves within the plane intersecting with the blade longitudinal direction, so that the coupling rod moves within a plane intersecting with the axis of the wind turbine blade.

When the coupling rod moves, the driving position of the wind turbine blade mounted on the coupling rod moves, so that the wind turbine blade is rotated around the blade longitudinal direction. Therefore, it is possible to adjust the pitch angle of the wind turbine blade.

In the above aspect, since the electric drive member is electrically driven, the structure of an electric wire thereof becomes simple as compared with a hydraulic pipe, and there is no risk such as mixture of a foreign matter and leakage of oil. Further, as a contact portion causing fine motion is not included, it is unnecessary to take a fretting damage into consideration. Moreover, a part having short lifetime such as a belt is not included, a troublesome frequent maintenance operation is not required.

With this structure, it is possible to prevent long-term reliability of the pitch drive apparatus from being deteriorated.

In the above aspect, there may be further included a support member mounted on the rotor head so as to rotatably support a free end of the output shaft.

Since the pitch drive apparatus includes the support member mounted on the rotor head to rotatably support the free end of the output shaft, one end of the output shaft is supported by the electric motor and the other end of the output shaft is supported by the support member. Therefore, both the ends of the output shaft are supported, so that the output shaft can rotate stably.

According to a second aspect of the present invention, there is provided a wind generator including: a plurality of wind turbine blades for receiving wind power; a rotary head for supporting the wind turbine blades so as to be turnable around an axis thereof, and being rotated and driven by the wind turbine blades; a pitch drive apparatus according to the first aspect; and a generator set for generating electricity by rotation of the rotor head.

According to the above aspect, reliability of the pitch drive apparatus is prevented from being deteriorated by using the pitch drive apparatus according to the first aspect. Thus, it is possible to prevent reliability of the wind generator from being deteriorated by the pitch drive apparatus.

According to the present invention, since the electric motor is electrically driven, the structure of the electric wire thereof becomes simple as compared with a hydraulic pipe, and there is no risk such as mixture of a foreign matter and leakage of oil. Further, as a contact portion causing fine motion is not included, it is unnecessary to take a fretting damage into consideration. Moreover, a part having short lifetime such as a belt is not included, a troublesome frequent maintenance operation is not required.

With this structure, it is possible to prevent long-term reliability of the pitch drive apparatus from being deteriorated.

EXPLANATION OF REFERENCE

Figure 1:
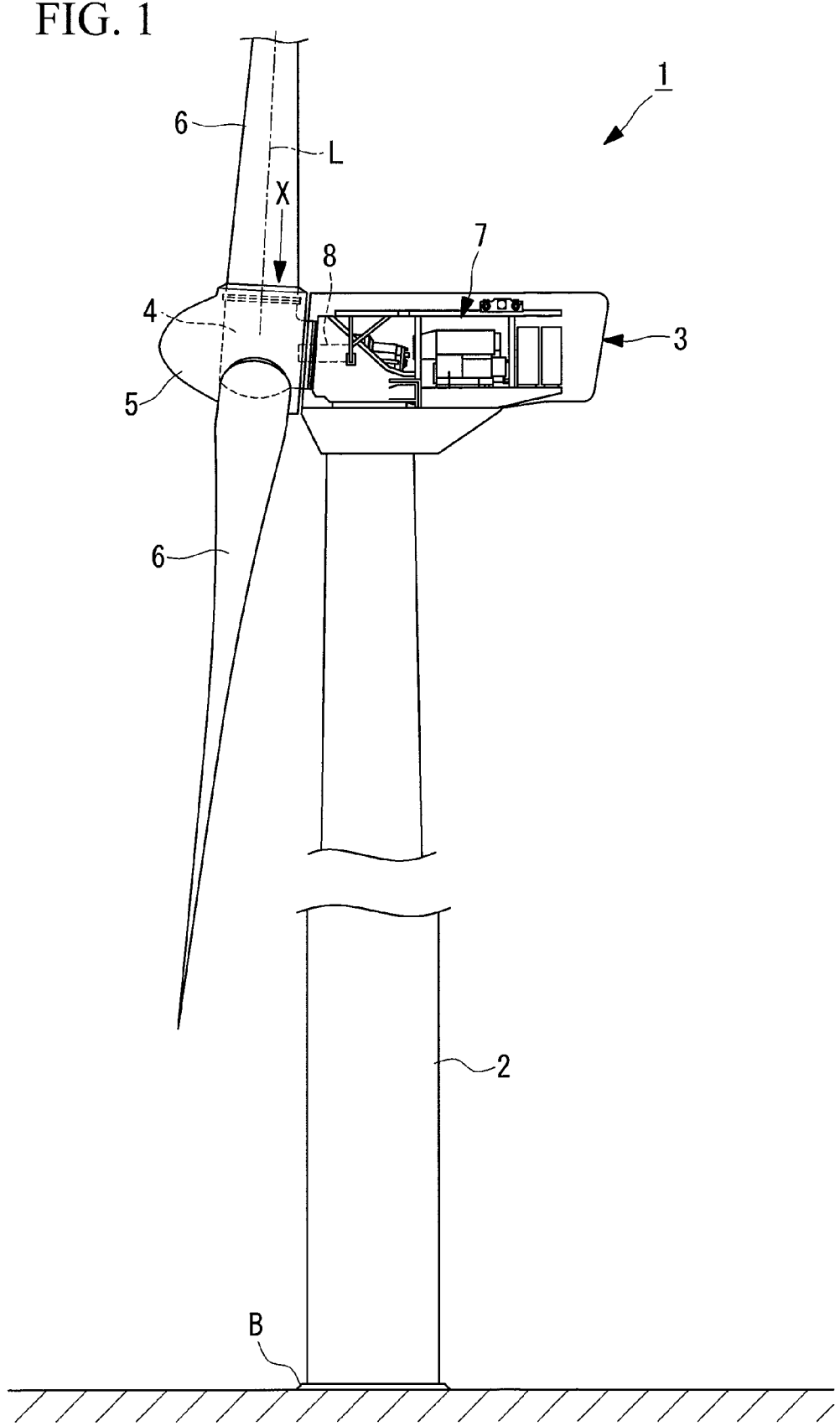
FIG. 1 A side view showing an overall schematic structure of a wind generator according to a first embodiment of the present invention.

1: Wind generator
4: Rotor head
6: Wind turbine blade
7: Generator set
11: Pitch drive apparatus
13: Electric motor
15: Lever
17: Connection link
19: Output shaft
21: Base portion
39: Bearing
L: Axis center
P: Drive position

BEST MODE FOR CARRYING OUT THE INVENTION

A wind generator according to an embodiment of the present invention will be explained with reference to FIGS. 1 to 4.

FIG. 1 is a side view showing an overall schematic structure of a wind generator 1 according to the present embodiment.

The wind generator 1 includes a column 2 standing on a base B, a nacelle 3 provided on an upper end of the column 2, a rotor head 4 provided on the nacelle 3 so as to be rotatable around a substantially horizontal axis, a head capsule 5 covering the rotor head 4, a plurality of wind turbine blades 6 radially mounted around a rotation axis of the rotor head 4, and a generator set 7 which generates electricity by rotating the rotor head 4.

As shown in FIG. 1, the column 2 extends upward from the base B (upward in FIG. 1), and a plurality of units is connected in the vertical direction or the like.

The uppermost portion of the column 2 is provided with the nacelle 3. When the column 2 includes the plurality of units, the nacelle 3 is disposed on the uppermost unit.

As shown in FIG. 1, the nacelle 3 rotatably supports a rotor head 4 by a main shaft 8. A generator set 7 which generates electricity by rotation of the rotor head 4 (i.e., the main shaft 8) is accommodated in the nacelle 3.

The generator set 7 may include a gear box which increases the number of revolutions of the main shaft 8, a generator to which a rotation driving force of the rotor head 4 is transmitted to generate electricity, and a transformer which converts a voltage generated by the generator into a predetermined voltage.

The plurality of, such as three, wind turbine blades 6 is radially mounted on the rotor head 4 around the rotation axis thereof, and the periphery of the rotor head 4 is covered with the head capsule 5.

In this structure, when a wind hits the wind turbine blades 6 from a direction of the rotation axis of the rotor head 4, a force for rotating the rotor head 4 around its rotation axis is generated in the wind turbine blades 6, and the rotor head 4 is rotated and driven.

Although three wind turbine blades 6 are provided in this embodiment, the number of the wind turbine blades 6 is not limited to three, but the number may be less than three, four or more with no particular limitation.

Figure 2:
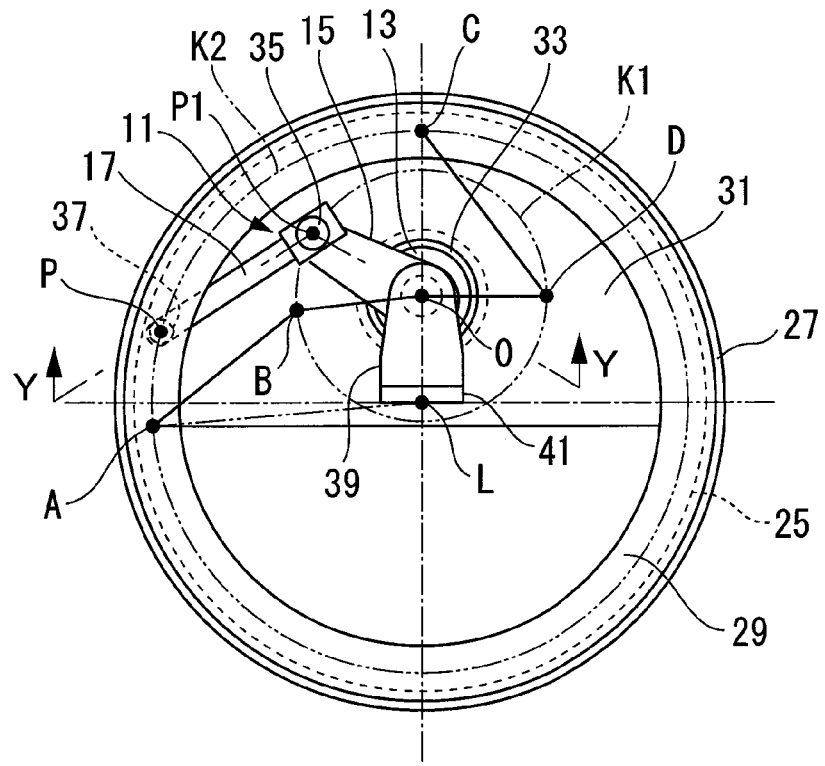
FIG. 2 A view along the X direction in FIG. 1, of a pitch drive apparatus according to the first embodiment of the present invention.
Figure 3:
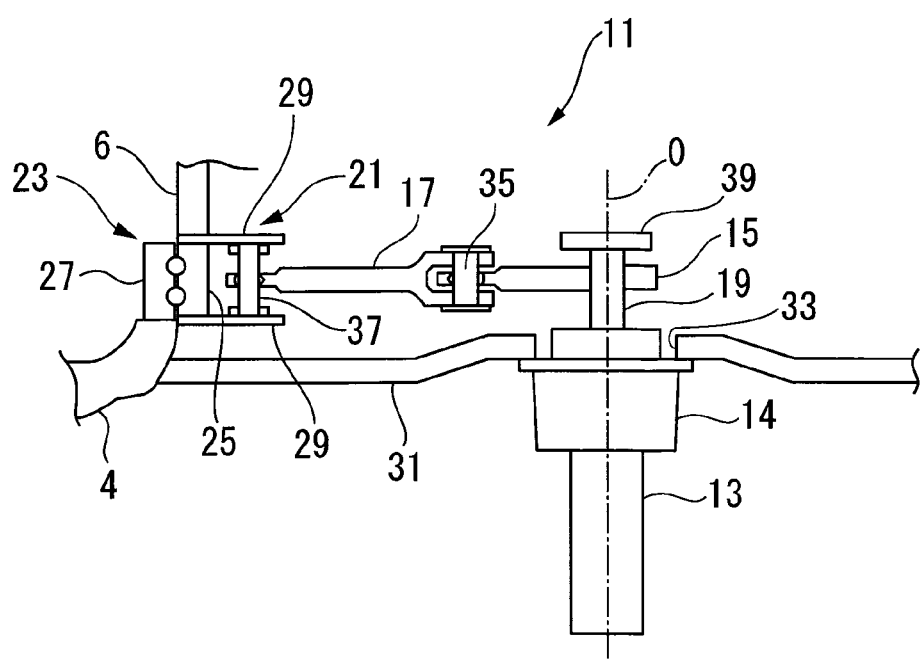
FIG. 3 A sectional view taken along the line Y-Y in FIG. 2.
Figure 4:
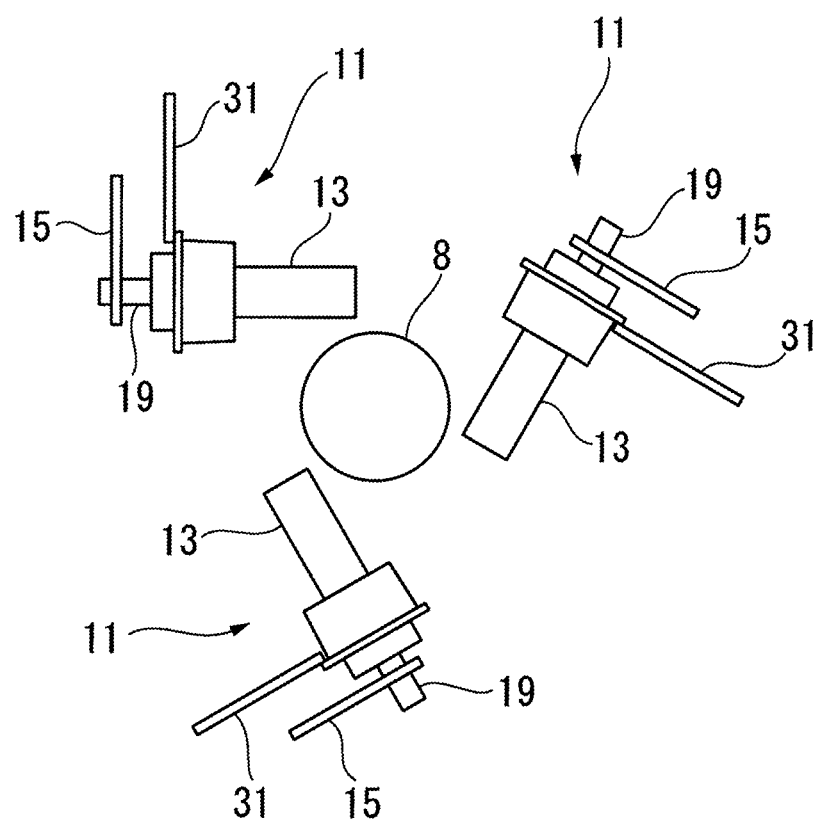
FIG. 4 A schematic diagram showing a layout of the pitch drive apparatus in which a rotor head 4 according to the first embodiment of the present invention is viewed from an upstream side of wind.

FIG. 2 is a view along the X direction in FIG. 1, of a pitch drive apparatus 11. FIG. 3 is a sectional view taken along the line Y-Y in FIG. 2. FIG. 4 is a schematic diagram showing a layout of the pitch drive apparatus 11 in which a rotor head 4 in FIG. 1 is viewed from an upstream side of wind.

The rotor head 4 is provided with pitch drive apparatuses 11 each of which rotates each of the wind turbine blades 6 around the axis center (axis) L to change a pitch angle of the corresponding wind turbine blade 6. The pitch drive apparatuses 11 are provided so as to correspond to the wind turbine blades 6 in a one-to-one correspondence relationship.

The wind turbine blade 6 is provided at a blade root side thereof with a base portion (blade root) 21 which is turnably supported on the rotor head 4 by the rotating wheel bearing 23.

The rotating wheel bearing 23 includes two rows of rolling bearings. The rotating wheel bearing 23 is not limited to the rolling bearings and may include slide bearings.

The base portion 21 is formed such that two drive plates 29 sandwich two ends of the rotating wheel bearing 23 in a thickness direction of the inner wheel 25. Each of the drive plates 29 has a doughnut shape (an annular shape) and projects inward with respect to the inner wheel 25. That is, an inner diameter of the drive plate 29 is equal to or smaller than that of the inner wheel 25.

An outer wheel 27 of the rotating wheel bearing 23 is fixed to the rotor head 4.

Since the wind turbine blade 6 is fixed to the inner wheel 25 of the rotating wheel bearing 23, the wind turbine blade 6 can turn with respect to the rotor head 4.

The rotor head 4 is provided with a substantially semicircular support plate 31 on the side of a center of rotation of the rotor of the rotating wheel bearing 23. A through hole 33 is provided at a substantially central position of the support plate 31.

The pitch drive apparatus 11 includes a speed reducer 14, an electric motor 13, a lever 15, and a connecting link (a connecting rod) 17. The support plate 31 may be molded using the member same as that of the rotor head 4, or may be formed as a separate member to be fixed to the rotor head 4 by means of a bolt 4 or the like.

The electric motor 13 and the speed reducer 14 constitute an electric drive member of the present invention. Output of the electric motor 13 is decelerated by the speed reducer 14, and is transmitted to an output shaft 19 of the speed reducer 14.

The electric motor 13 and the speed reducer 14 are disposed such that the output shaft 19 passes through the through hole 33 to be located on the side of the wind turbine blade 6 and an axis center O thereof is substantially in parallel to an axis center L of the wind turbine blade 6 at a location separated from the axis center L. The electric motor 13 and the speed reducer 14 are fixed to an inner periphery of the through hole 33.

Since the electric motor 13 is electrically driven, the structure of an electric wire thereof becomes simple as compared with a hydraulic pipe. Further, since there is no connecting operation of the hydraulic pipe, there is no risk such as mixture of a foreign matter and leakage of oil. Moreover, since a contact portion causing fine motion is not included, it is unnecessary to take a fretting damage into consideration. A part having short lifetime such as a belt is not included, a troublesome frequent maintenance operation is not required.

With this structure, it is possible to prevent long-term reliability of the pitch drive apparatus 11 from being deteriorated.

The lever 15 and the connecting link 17 are disposed so as to extend in a direction intersecting with the axis center O substantially at right angles, i.e., in a direction intersecting with the output shaft 19. That is, the lever 15 and the connecting link 17 are disposed along a plane of the extending drive plate 29.

One end of the lever 15 is fixed to the output shaft 19. The other end (a free end) of the lever 15 is connected to one end of the connecting link 17 via a pin 35 so as to be relatively rotatable. The lever 15 is engaged with a spherical seat projecting from an intermediate portion of the pin 35 and the lever 15 is allowed to bend.

A link pin 37 is attached between the pair of drive plates 29. The projecting spherical seat is provided in the intermediate portion of the link pin 37. The other end of the connecting link 17 is engaged with the spherical seat of the link pin 37, and is connected to the link pin 37 to as to be rotatable and be inclined. This link pin 37 forms a drive position P of the present invention.

A tip end (a free end) of the output shaft 19 is rotatably supported by a bearing (a support member) 39. The bearing 39 is mounted on a bracket 41 which stands on the support plate 31.

One end of the output shaft 19 is supported by the electric motor 13 and the other end thereof is supported by the bearing 39. That is, since both the ends of the output shaft 19 are supported, the output shaft can rotate stably.

The pitch drive apparatuses 11 are provided in correspondence with the wind turbine blades 6 respectively. As shown in FIG. 4, the pitch drive apparatuses 11 can be disposed around the axis center of the rotor head 4, i.e., around the main shaft 8. Therefore, the pitch drive apparatuses 11 can be disposed on a plane intersecting with the axial direction of the rotor head 4.

Next explained is an outline of an electricity generating method with use of the wind generator 1 having the above-described structure.

In the wind generator 1, a force of wind which hits the wind turbine blade 6 from the rotation axial direction of the rotor head 4 is converted into power for rotating the rotor head 4 around the rotation axis.

The rotation of the rotor head 4 is transmitted to the generator set 7 through the main shaft 8, and electricity corresponding to a target to supply electricity, e.g., AC electricity having a frequency of 50 Hz or 60 Hz is generated by the generator set 7.

At least while electricity is generated, in order to effectively apply a wind force to the wind turbine blade 6, the nacelle 3 is appropriately rotated on a horizontal plane and the rotor head 4 is thus directed upstream of the wind.

Next explained is control of a pitch angle of the wind turbine blade 6 by the pitch drive apparatus 11.

In a case where the electric motor 13 mounted on the rotor head 4 is operated, the output shaft 19 rotates.

When the output shaft 19 rotates, the lever 15 turns around the axis center O of the output shaft 19 along a plane of the extending drive plate 29. At this time, an axis center P1 of a pin for connecting the lever 15 and the connecting link 17 moves on a locus K1 around the axis center O as shown in FIG. 2. That is, the axis center P1 moves so as to draw a circle.

When the axis center P1 as a connecting portion between the lever 15 and the connecting link 17 moves, one end of the connecting link 17 moves in a plane intersecting with the axis of the wind turbine blade. Accordingly, the other end of the connecting link 17 engaged with the link pin 37 moves along the plane of the extending drive plate 29.

When the other end of the connecting link 17 moves, the other end pushes or pulls the drive plate 29 via the link pin 37 so as to move the drive plate 29. In this case, the drive position P moves along a locus K2.

When the drive position P of the drive plate 29 moves, the wind turbine blade 6 integrally provided with the drive plate 29 is rotated around the axis center O. Therefore, the pitch angle of the wind turbine blade can be adjusted.

According to the present embodiment, when the drive position P is located at a point C shown in FIG. 2, the wind turbine blade 6 becomes fine. On the other hands, when the drive position P is located at a point A, the wind turbine blade 6 becomes feathering.

When the drive position P is located at the point A, the axis center P1 is located at a point B, on the other hands, when the drive position P is located at the point C, the axis center P1 is located at a point D.

In this case, an adjusting range of the pitch angle of the wind turbine blade 6, i.e., an angle ALC of rotation of the drive plate 29 is about 95°. An angle BOD of rotation of the lever 15 is about 180°.

The position of the axis center O, the length of the lever 15, and the length of the connecting link 17 are selected such that the angle AOC is secured to have about 95°.

The present invention is not limited to the embodiments described above, but can appropriately be changed within a range not departing from a subject matter of the present invention.

The invention claimed is:

1. A pitch drive apparatus for a wind generator, the pitch drive apparatus for moving a wind turbine blade having a blade root mounted so as to be turnable around a blade longitudinal direction with respect to a rotor head, the pitch drive apparatus comprising:
    an electric drive member positioned so that an output shaft extends in the blade longitudinal direction;
    a lever fixed to the output shaft and extending in a direction intersecting with the output shaft; and
    a coupling rod positioned to extend in a direction intersecting with the output shaft and rotatably mounted around the blade longitudinal direction to connect drive positions of the lever and the wind turbine blade with each other,
    wherein an axis center of the output shaft is disposed at a location separated from an axis center of the wind turbine blade.

2. A pitch drive apparatus for a wind generator, the pitch drive apparatus for moving a wind turbine blade having a blade root mounted so as to be turnable around a blade longitudinal direction with respect to a rotor head, the pitch drive apparatus comprising:
    an electric drive member positioned so that an output shaft extends in the blade longitudinal direction;
    a lever fixed to the output shaft and extending in a direction intersecting with the output shaft;
    a coupling rod positioned to extend in a direction intersecting with the output shaft and rotatably mounted around the blade longitudinal direction to connect drive positions of the lever and the wind turbine blade with each other; and
    a support member mounted on the rotor head so as to rotatably support a free end of the output shaft.

3. A wind generator comprising:
    a plurality of wind turbine blades for receiving wind power;
    a rotary head for supporting the wind turbine blades so as to be turnable around an axis thereof, and to be rotated and driven by the wind turbine blades;
    a pitch drive apparatus according to claim 1; and
    a generator set for generating electricity by rotation of the rotor head.

4. A wind generator comprising:
    a plurality of wind turbine blades for receiving wind power;
    a rotary head for supporting the wind turbine blades so as to be turnable around an axis thereof, and to be rotated and driven by the wind turbine blades;
    a pitch drive apparatus according to claim 2; and
    a generator set for generating electricity by rotation of the rotor head.

* * * * *